US010269091B1

United States Patent
Mang et al.

(10) Patent No.: US 10,269,091 B1
(45) Date of Patent: Apr. 23, 2019

(54) RE-USING GRAPHICS VERTEX IDENTIFIERS FOR PRIMITIVE BLOCKS ACROSS STATES

(71) Applicant: Apple Inc., Cupertino, CA (US)

(72) Inventors: Michael A. Mang, Oviedo, FL (US); Andrew M. Havlir, Orlando, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/809,687

(22) Filed: Nov. 10, 2017

(51) Int. Cl.
   *G06T 1/20* (2006.01)
   *G06T 15/00* (2011.01)
   *G06T 1/60* (2006.01)
   *G06T 7/49* (2017.01)

(52) U.S. Cl.
   CPC .................. *G06T 1/60* (2013.01); *G06T 1/20* (2013.01); *G06T 7/49* (2017.01); *G06T 15/005* (2013.01); *G06T 2210/52* (2013.01)

(58) Field of Classification Search
   None
   See application file for complete search history.

(56) References Cited

U.S. PATENT DOCUMENTS

| 5,784,075 | A | 7/1998 | Krech, Jr. | |
| 7,705,845 | B1 | 4/2010 | Parikh et al. | |
| 8,169,437 | B1 * | 5/2012 | Legakis | G06T 17/20 345/423 |
| 2011/0216069 | A1 * | 9/2011 | Keall | G06T 11/20 345/441 |
| 2014/0139534 | A1 | 5/2014 | Tapply et al. | |
| 2014/0267373 | A1 * | 9/2014 | Kilgard | G06T 7/0079 345/611 |
| 2017/0178397 | A1 * | 6/2017 | Hillesland | G06T 15/80 |
| 2017/0330372 | A1 * | 11/2017 | Kakarlapudi | G06T 11/40 |

* cited by examiner

*Primary Examiner* — Joni Richer
(74) *Attorney, Agent, or Firm* — Meyertons, Hood, Kivlin, Kowert & Goetzel, P.C.

(57) ABSTRACT

Techniques are disclosed relating to storage techniques for storing primitive information with vertex re-use. In some embodiments, graphics circuitry aggregates primitive information (including vertex data) for multiple primitives into a primitive block data structure. This may include storing only a single instance of a vertex for multiple primitives that share the vertex. The graphics circuitry may switch between primitive blocks, with one being active and the others non-active. For non-active primitive blocks, the graphics circuitry may track whether vertex identifiers have been used for a new vertex, which may prevent vertex re-use. If an identifier is not used for a new vertex, however, a vertex may be re-used across deactivation and reactivation of a primitive block.

20 Claims, 9 Drawing Sheets

EXAMPLE A

Primitive Block A Active
Primitive Block B Active (A non-active)
Primitive Block A Active Receive indices 0, 1, 2
Receive indices 3, 4, 5
Receive index 0 ⟶ Can re-use this vertex

EXAMPLE B

Primitive Block A Active
Primitive Block B Active (A non-active)
Primitive Block A Active Receive indices 0, 1, 2
Receive index 0 (new)
Receive indices 0, 1, 2 ⟶ Cannot re-use 0, but can re-use 1 and 2

RE-USING GRAPHICS VERTEX IDENTIFIERS FOR PRIMITIVE BLOCKS ACROSS STATES

BACKGROUND

Technical Field

This disclosure relates generally to graphics processors and more specifically to techniques for storing primitive information with vertex re-use.

Description of the Related Art

In some graphics processors, primitives (e.g., triangles) are grouped into "primitive block" data structures for further processing. For example, if two primitives share a vertex, the vertex can be stored once in the primitive block, reducing overall storage space requirements. Vertices may be identified using different indices, for example. Switching between primitive blocks may be useful for graphics processing but may prevent vertex re-use across deactivation and reactivation of a primitive block, e.g., because of the potential for change in use of an index while a primitive block is deactivated.

BRIEF DESCRIPTION OF THE DRAWINGS

FIG. 6 is a diagram illustrating processing examples across primitive block deactivation and reactivation, according to some embodiments.

Figure 1A:
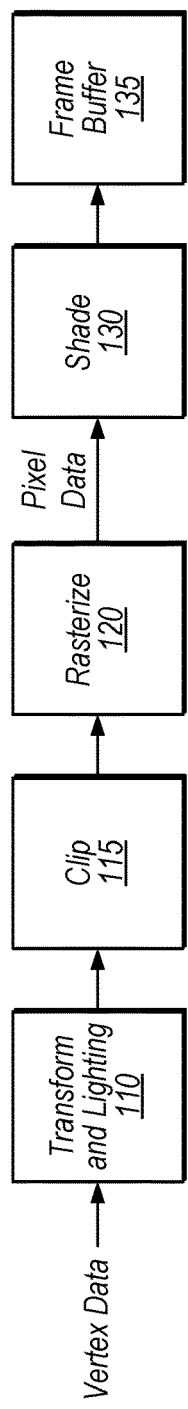
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
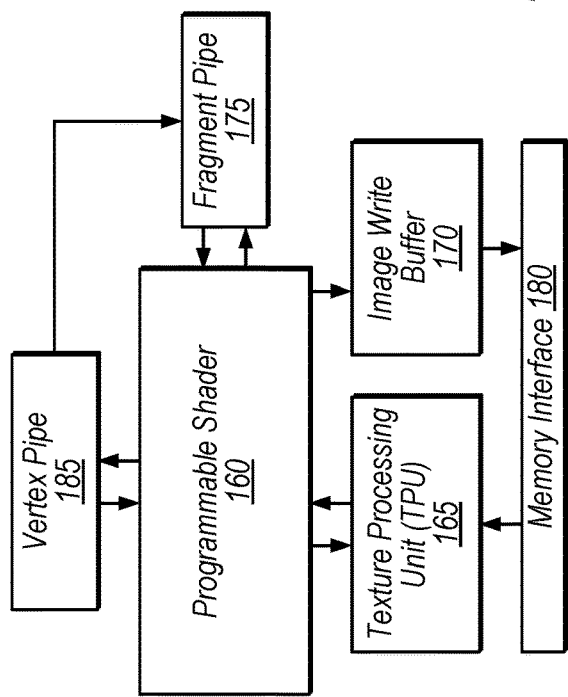
FIG. 1B is a block diagram illustrating one embodiment of a graphics unit.
Figure 2:
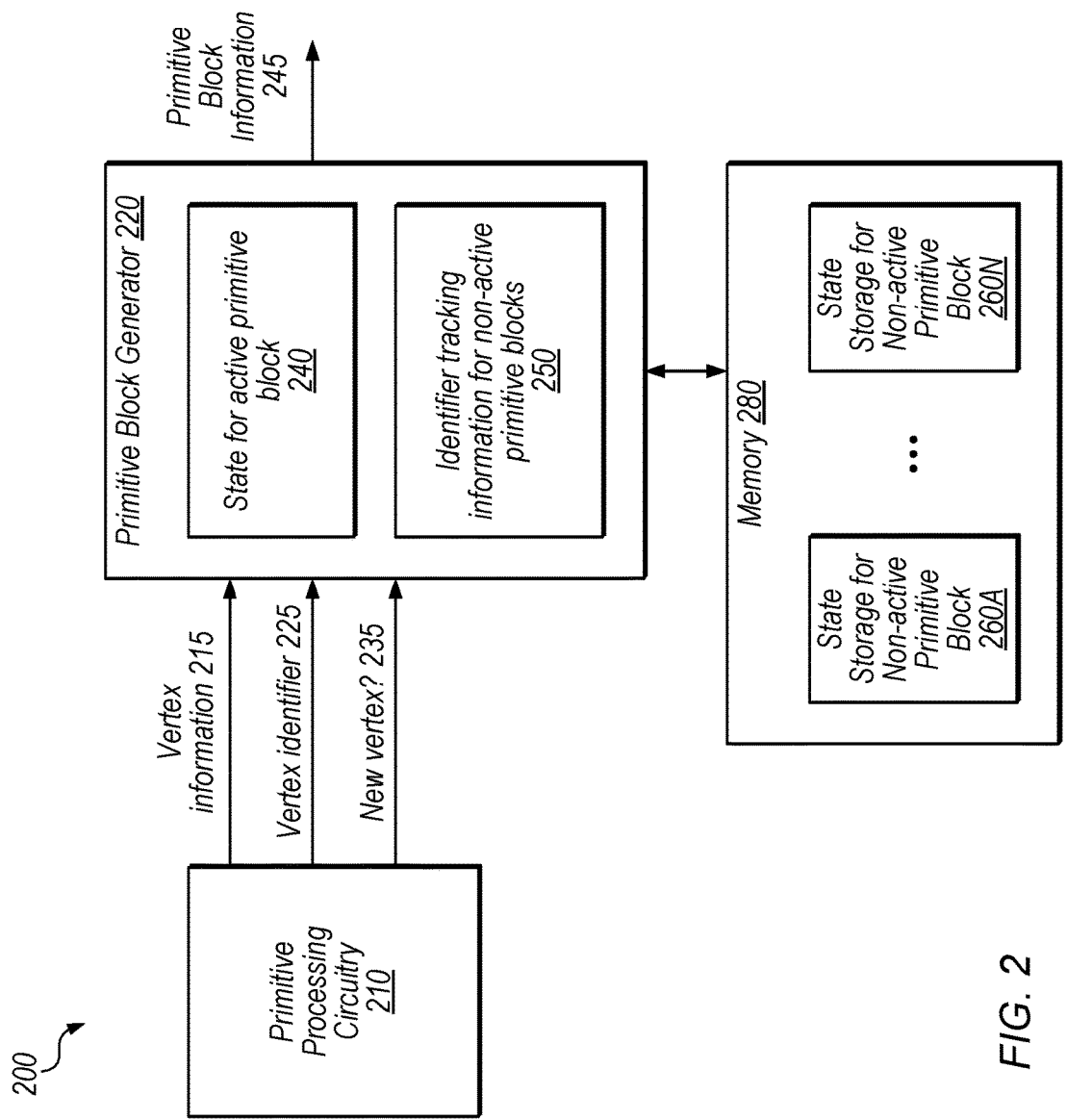
FIG. 2 is a block diagram illustrating exemplary circuitry configured to aggregate primitive information into primitive blocks, according to some embodiments.
Figure 3:
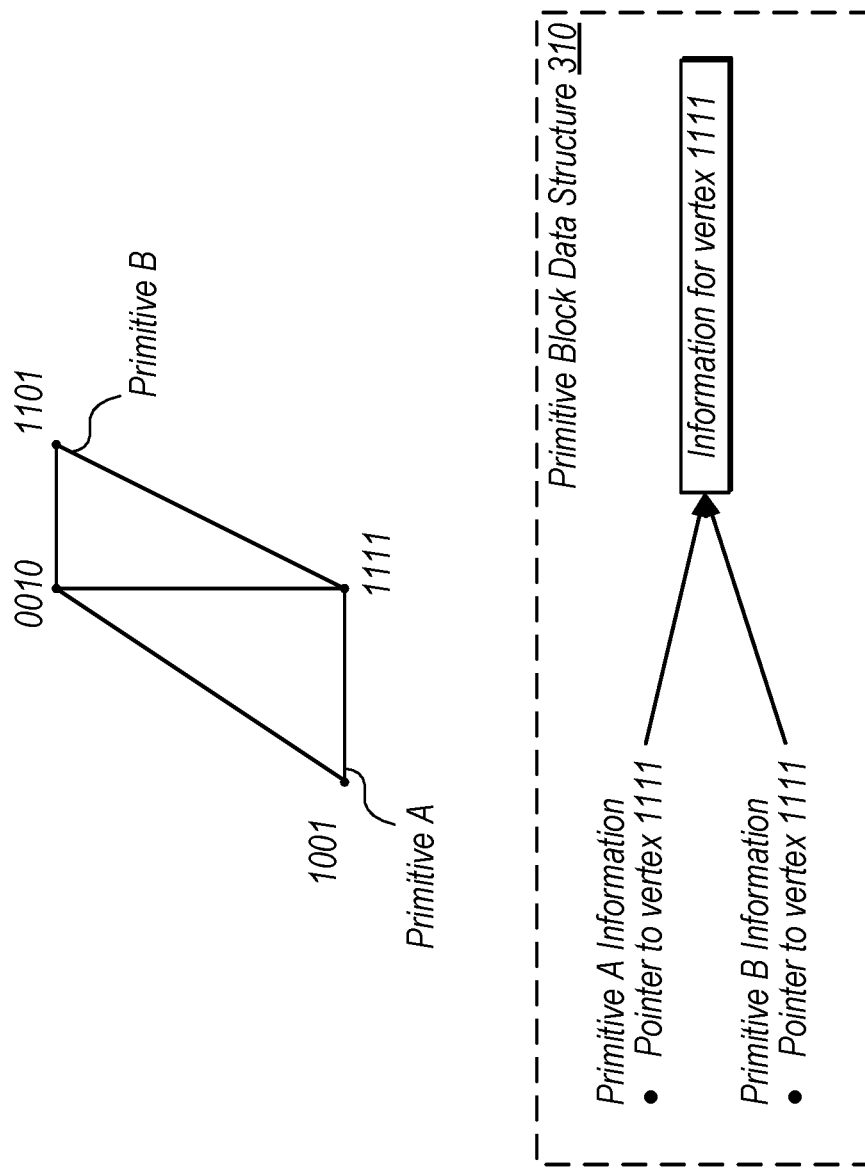
FIG. 3 is a diagram illustrating exemplary sharing of a vertex between two primitives, according to some embodiments.
Figure 4:
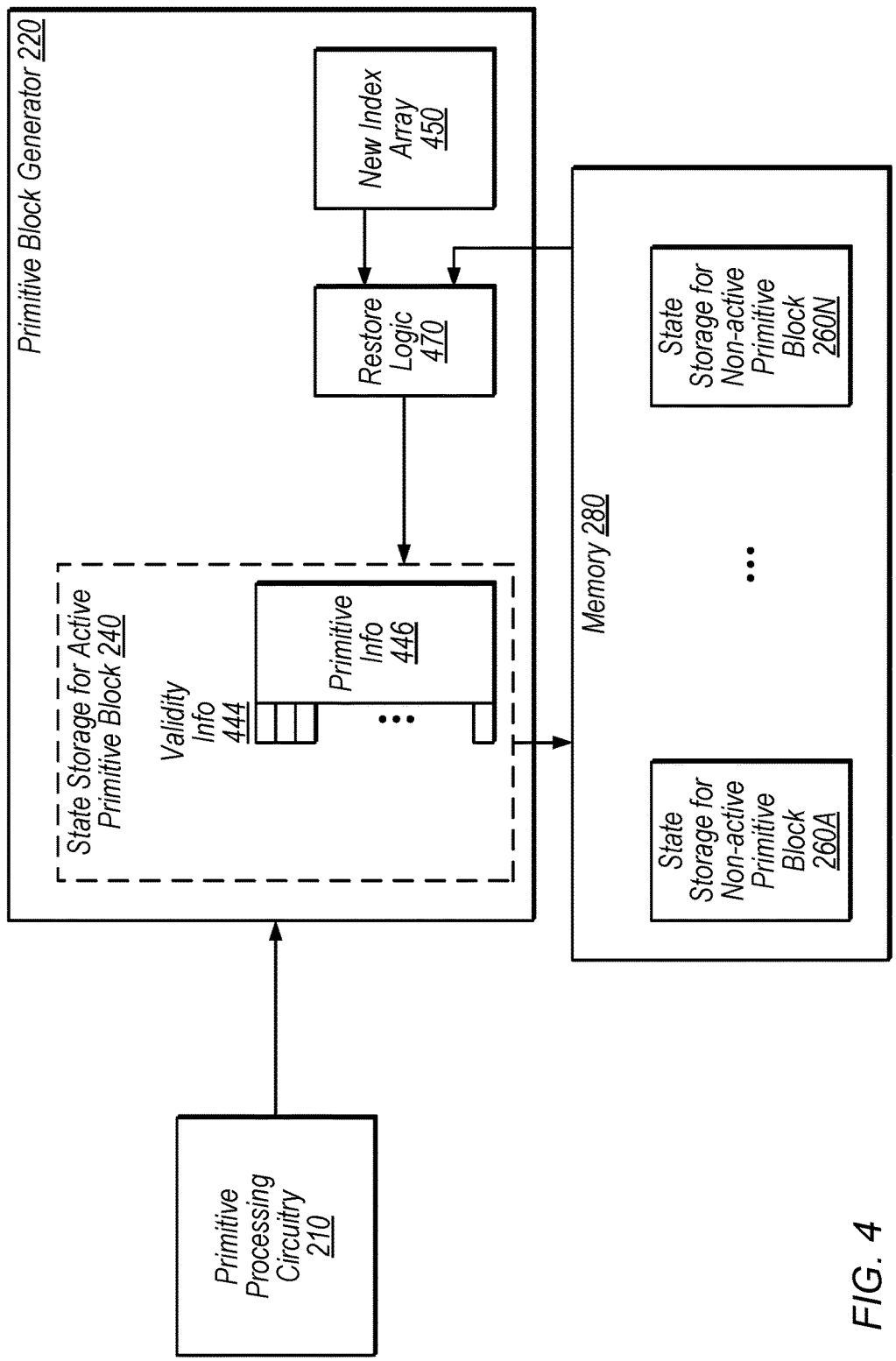
FIG. 4 is a block diagram illustrating exemplary state storage for a primitive block, according to some embodiments.
Figure 5:
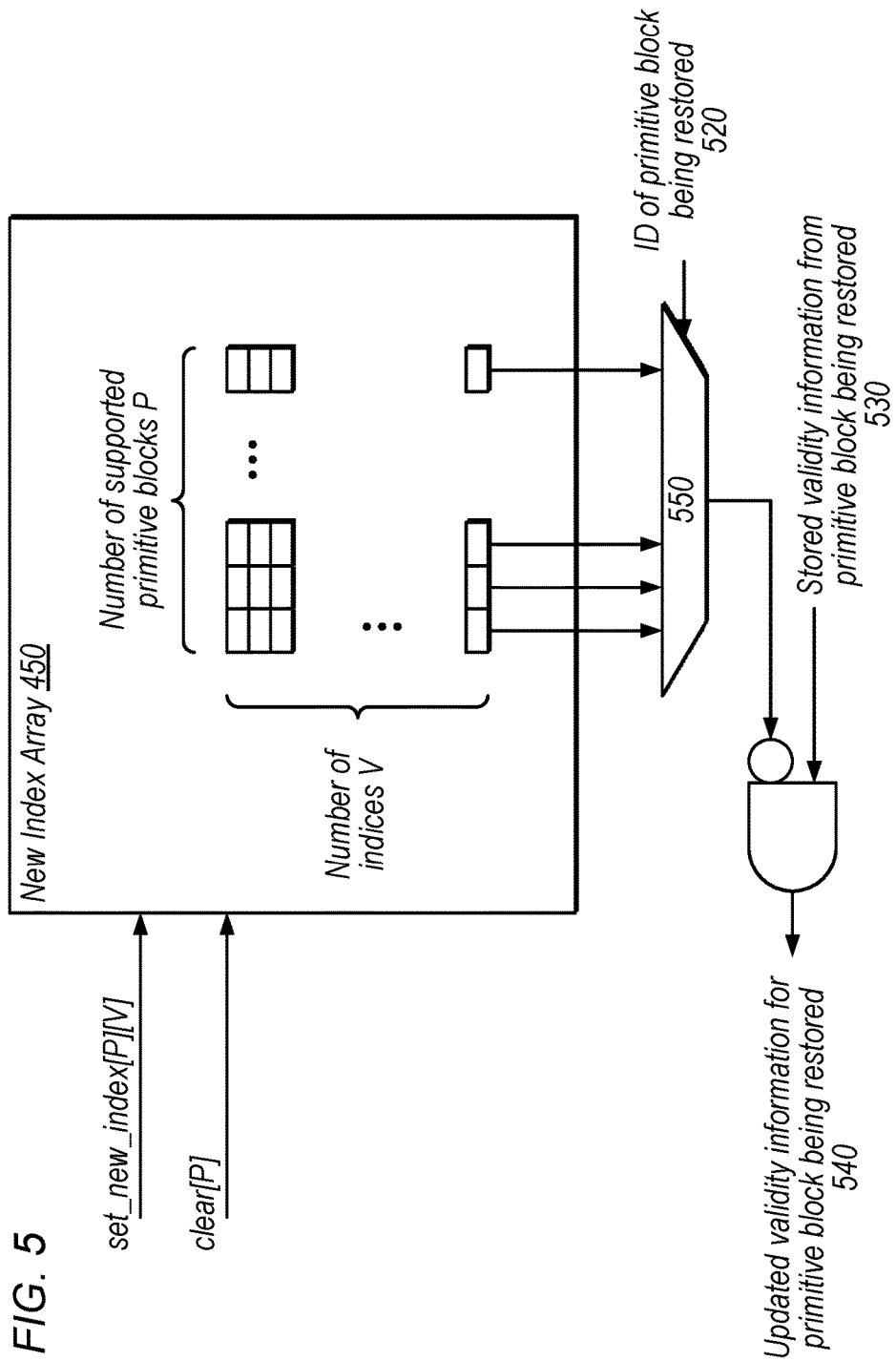
FIG. 5 is a block diagram illustrating an exemplary new index array and restore logic, according to some embodiments.
Figure 7:
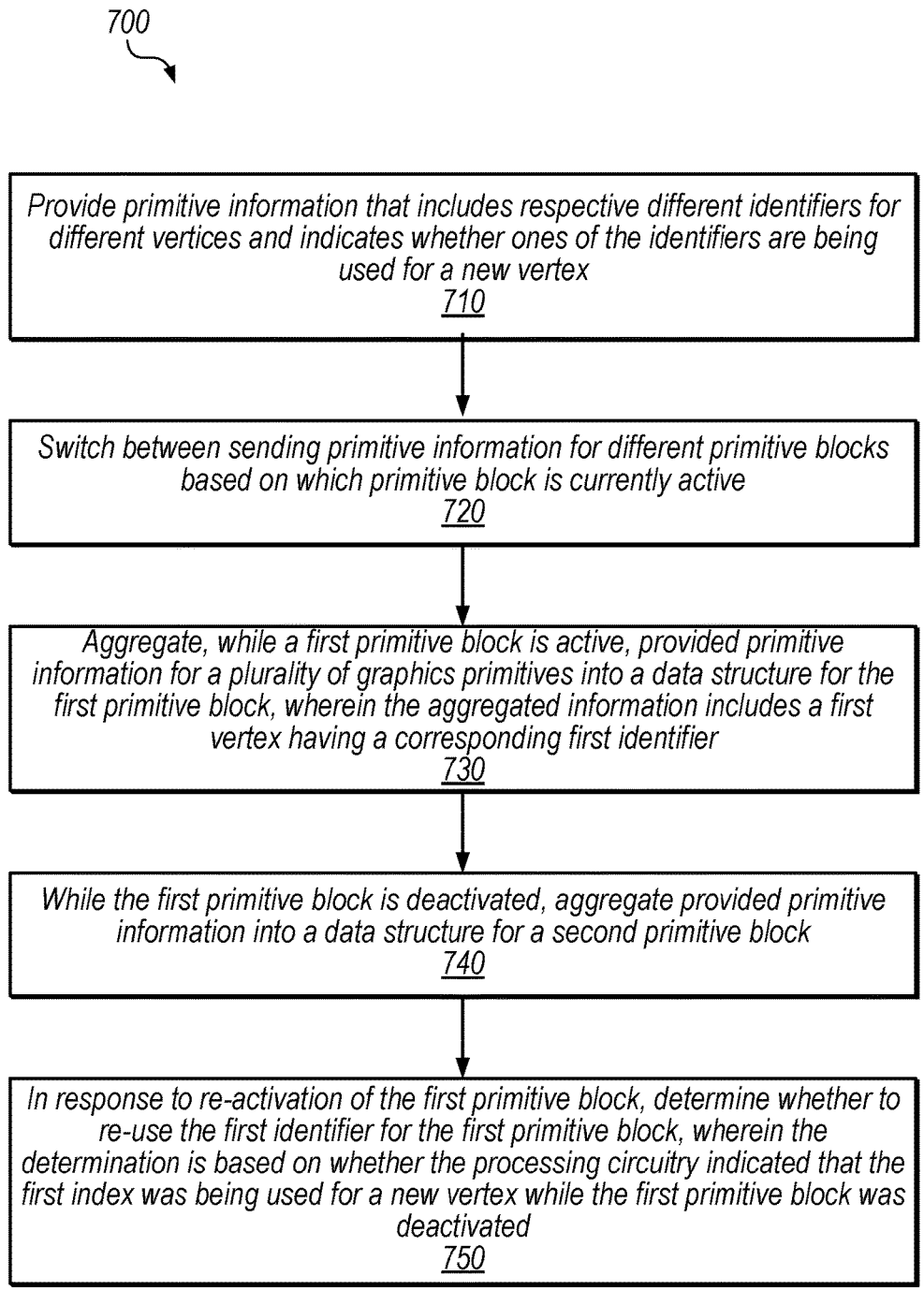
FIG. 7 is a flow diagram illustrating an exemplary method for vertex re-use, according to some embodiments.
Figure 8:
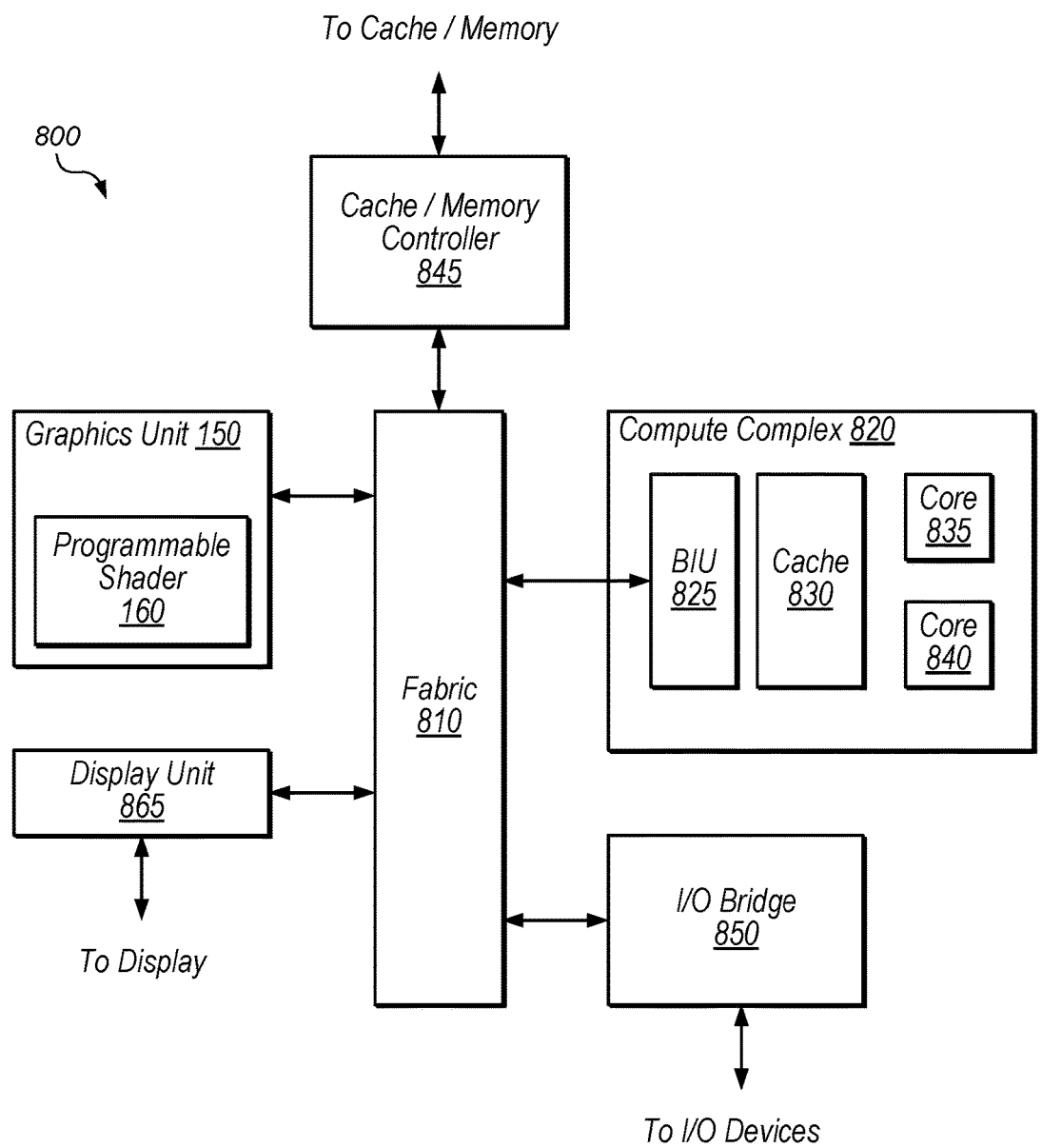
FIG. 8 is a block diagram illustrating one embodiment of a device that includes a graphics unit.
Figure 9:
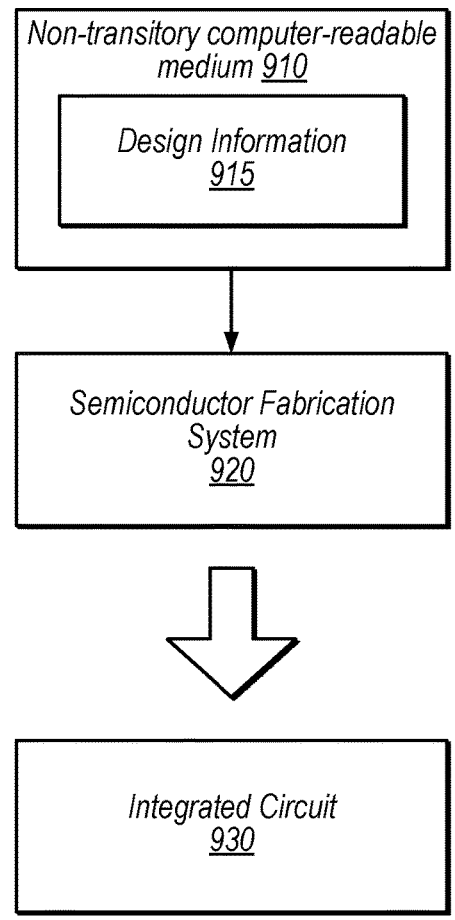
FIG. 9 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates exemplary primitive block generator circuitry, FIG. 3 illustrates exemplary primitives that share two vertices, FIG. 4 illustrates more detailed state information for a primitive block, FIG. 5 illustrates a detailed new index array, and FIG. 6 illustrates exemplary sequences of received vertex indices. FIG. 7 illustrates an exemplary method, FIG. 8 illustrates an exemplary device, and FIG. 9 illustrates an exemplary computer-readable medium. In various embodiments, the disclosed techniques may provide efficient storage for primitive information for graphics processing.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Primitive Block Techniques

In some embodiments, graphics unit 150 is configured to generate "primitive block" data structures that store data for multiple primitives. In some embodiments, this may reduce memory requirements, e.g., when multiple primitives share information that can be stored once and then referenced for each primitive (rather than being stored multiple times, e.g., once for each primitive in implementations without primitive blocks).

FIG. 2 is a block diagram illustrating an exemplary portion of graphics unit 150, according to some embodiments. For example, the illustrated circuitry may be included in vertex pipe 185 or may be included in control circuitry not explicitly shown in FIG. 1B. In the illustrated embodiment, circuitry 200 includes primitive processing circuitry 210, primitive block generator 220, and memory 280.

Primitive processing circuitry 210, in the illustrated embodiment, is configured to assign identifiers to vertices of processed primitives. For example, referring briefly to FIG. 3, two triangular primitives A and B are shown and each vertex is assigned a four-bit identifier (although any of various number of bits may be used for vertex identifiers in other embodiments). Note that the vertices 1111 and 0010 are shared by the two primitives. Primitive processing circuitry 210 may be configured to assign such identifiers and may also be configured to generate information for a vertex associated with each identifier such as coordinates representing a position of the vertex, surface color, lighting information, reflectance, texture coordinates, normal vectors, etc. (These examples of vertex information are exemplary only, certain vertex information may be calculated later in the processing pipeline, other types of information may be maintained, and so on).

Turning back to FIG. 2, in the illustrated embodiment, primitive processing circuitry 210 is configured to send vertices to primitive block generator 220. Specifically, vertex information 215 indicates attributes of the vertex being sent, vertex identifier 225 specifies the identifier for the vertex, and new vertex indicator 235 indicates whether the vertex is a new vertex for that identifier. For example, given a limited number of bits available for vertex identifiers, primitive processing circuitry 210 may need to assign a previously-used identifier to a new vertex. In that case, indicator 235 may indicate that the identifier is no longer being used for the old vertex. In some embodiments, primitive processing circuitry 210 may query primitive block generator 220 with a vertex identifier 225 and may only send vertex information 215 if primitive block generator indicates that it does not have valid information for the vertex.

Primitive block generator 220, in the illustrated embodiment, is configured to locally maintain state information for an active primitive block in storage element 240. For example, primitive block generator 220 may store received vertex information 215 for primitives in a given active primitive block. The numbers of vertex identifiers and the number of primitives supported by each primitive block may vary. Primitive block generator 220, in the illustrated embodiment, is configured to transmit primitive block information 245 (e.g., completed primitive blocks) for further processing (e.g., by fragment processing hardware). In some embodiments, primitive block generator 220 is configured to perform compression before storing primitive block information 245, e.g., to further reduce memory requirements for primitive blocks.

In the illustrated embodiment, primitive block generator 220 is also configured to store state information for non-active primitive blocks for storage in memory 280 (shown as state storage elements 260A-260N in FIG. 2). For example, processing circuitry 210 may switch between different primitive blocks corresponding to different layers and only the primitive block for the current layer may be kept as active by primitive block generator 220. Information stored in memory 280 may not be readily available to primitive block generator 220 (e.g., it may take a large number of cycles to access state information 260 relative to state information 240 for the active primitive block).

Identifier tracking information for non-active primitive blocks 250, in the illustrated embodiment, is used to keep track of whether a new vertex has been assigned to a particular identifier while a primitive block is non-active. In some embodiments, this may allow vertices to be re-used across deactivation and reactivation of a primitive block while preventing re-use of a vertex identifier that has been re-assigned. In various embodiments, this may reduce memory requirements for primitive storage and/or increase performance by increasing the number of hits in primitive block generator 220 for incoming vertices.

As briefly discussed above, FIG. 3 illustrates one example of storing a single instance of information for a particular vertex for multiple primitives. If primitive A and primitive B are processed before and after deactivation of their primitive block, respectively, using the same instance of information for a vertex (such as vertex 1111) is referred to herein as "vertex re-use." In the illustrated embodiment, since vertex 1111 is shared by primitive A and primitive B, its information is stored once in the primitive block data structure 310. In the illustrated embodiment, information for each primitive includes a pointer to the information for the shared vertex. In other embodiments, any of various techniques may be used to indicate the location of shared information; pointers are included for purposes of illustration but are not intended to limit the scope of the present disclosure.

FIG. 4 is a more detailed block diagram illustrating primitive block generator 220, according to some embodiments. In the illustrated embodiment, each vertex identifier is an index and state storage 240 includes validity information 444 for each index (e.g., indicating whether primitive block generator 220 already has vertex information stored for that index and/or that the vertex is a candidate for vertex re-use with future primitives). Primitive information 446 may store data being aggregated for the active primitive group. In some embodiments, corresponding validity information 444 is stored for non-active primitive blocks as well in memory 280.

New index array 450, in the illustrated embodiment, is one example of identifier tracking information 250 of FIG. 2. One exemplary embodiment of new index array 450 is shown in FIG. 5, discussed in further detail below.

Restore logic 470, in the illustrated embodiment, is configured to output adjusted validity information 444 for a primitive block being reactivated from memory 280 based on the information in new index array 450.

FIG. 5 is a block diagram illustrating a more specific example of new index array 450 and restore logic, according to some embodiments. In the illustrated embodiment, new index array 450 includes an entry (e.g., one bit) for each index for each of a number of primitive blocks P supported by graphics unit 150. For example, if up to four primitive blocks are supported with sixteen indices per primitive block, new index array 450 would include 64 entries.

In some embodiments, when indicator 235 indicates a new vertex for a particular index, that indexed is marked (e.g., set or cleared depending on implemented polarity) for all non-active primitive blocks. The set_new_index[P][V] signal is used to perform this marking, in the illustrated embodiment. In some embodiments, once a given primitive block is finished, the clear[P] command is used to clear the entries in new index array 450 for that primitive block.

In the illustrated embodiment, for reactivation of an inactive primitive block, a corresponding column of array 450 is accessed via multiplexer (MUX) 550, based on an ID 520 of the primitive block being restored. In the illustrated embodiment, the bits of this column are negated and then ANDed with stored validity information 530 from the primitive block being restored. In embodiments where a logical "1" represents a marked entry in array 450, this means that indices that the processing circuitry indicated as being re-used will be indicated as invalid in validity information 444 once the primitive block has been reactivated, preventing re-use of corresponding vertices.

For entries in array 450 that are not marked, however, consider a case where the corresponding index is marked as valid in validity information 444 and primitive processing circuitry 210 subsequently sends the index (e.g., as vertex identifier 225) and the new vertex indicator 235 indicates that the vertex is not new. In this case, primitive block generator 220 may re-use the stored information for the vertex rather than storing it again, reducing memory space needed for the primitive block.

FIG. 6 is a diagram illustrating different examples in which vertices may or may not be re-used, according to some embodiments. In example A, while primitive block A is active, circuitry 220 receives indices 0, 1, and 2 (the indices in FIG. 6 are shown using decimal notation). When primitive block B is activated and A is non-active, circuitry 220 receives indices 3, 4, and 5. When primitive block A is reactivated and circuitry 220 receives index 0, it can reuse the corresponding vertex, because the index was not used for a new vertex while primitive block A was deactivated.

In example B, while primitive block A is active, circuitry 220 receives indices 0, 1, and 2, similarly to example A.

When primitive block B is activated and A is non-active, circuitry 220 receives index 0 with an indication that index 0 is being used to identify a new vertex. In this example, the entry in non-active primitive blocks (including primitive block A) corresponding to index 0 is set responsively, in some embodiments. When primitive block A is reactivated and circuitry 220 receives index 0, it cannot reuse the corresponding vertex. Rather, the graphics unit may assign a new index for the vertex and may store another instance of the vertex in primitive block A.

FIG. 7 is a flow diagram illustrating an exemplary method 700 for vertex re-use, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, graphics processing circuitry (e.g., primitive processing circuitry 210) provides primitive information that includes respective different identifiers for different vertices. In the illustrated embodiment, the information also indicates whether ones of the identifiers are being used for a new vertex.

At 720, in the illustrated embodiment, the graphics processing circuitry switches between sending primitive information for different primitive blocks based on which primitive block is currently active. In some embodiments, each primitive block is assigned an identifier and the graphics processing circuitry notifies the primitive block circuitry which primitive block is currently active. The primitive block circuitry may store state information for an active primitive block locally and state information for non-active primitive blocks in another memory.

At 730, in the illustrated embodiment, primitive block circuitry (e.g., primitive block generator 220) aggregates, while a first primitive block is active, primitive information for a plurality of graphics primitives into a data structure for the first primitive block. In the illustrated embodiment, the aggregated information includes a first vertex having a corresponding first identifier. The aggregation may include storing a single instance of data for the first vertex for multiple primitives that share the first vertex.

At 740, in the illustrated embodiment, while the first primitive block is deactivated, the primitive block circuitry aggregates provided primitive information into a data structure for a second primitive block. For example, state information for the second primitive block may be stored in storage 240 while state information for the first primitive block is stored in memory 280 while it is deactivated. Deactivation of the first primitive block may involve storing its state in memory 280 to free up storage 240 for the second primitive block.

At 750, in the illustrated embodiment, the graphics unit determines (e.g., using restore logic 470) whether to re-use the first identifier for the first primitive block. In the illustrated embodiment, the determination is based on whether the processing circuitry indicated that the first identifier was being used for a new vertex while the first primitive block was deactivated. In particular, the graphics unit may allow re-use when the first identifier was not used for a new vertex while the first primitive block was deactivated. In some embodiments, identifier tracking circuitry (e.g., new index array 450) maintains, for each of multiple different identifiers and multiple different primitive blocks, an indication of whether an identifier has been used for a new vertex while a primitive block was deactivated.

In various embodiments, allowing vertex re-use in certain situations may substantially reduce memory space requirements for primitive information.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 150, and display unit 865. In some embodiments, device 800 may include other components (not shown) in addition to and/or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

In some embodiments, various elements of device 800 may include clock gaters arranged hierarchically, including various series of DET clock gaters coupled to deliver clock signals to different portions of a clock tree. The disclosed techniques may reduce switching power consumption in device 800, balance the clock delay to different portions of device 800, reduce errors in device 800, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 9 is a block diagram illustrating an exemplary non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable medium 910, may comprise any of various appropriate types of memory devices or storage devices. Medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 910 may include other types of non-transitory memory as well or combinations thereof. Medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabrication at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1B, 2, 4 and/or 5. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   graphics processing circuitry configured to:
   provide primitive information that includes respective different identifiers for different vertices and indicates, for each of the different identifiers, whether the identifier is being used for a new vertex; and
   switch between sending primitive information for different primitive blocks based on which primitive block is currently active;
   primitive block circuitry configured to:
   while a first primitive block is active, aggregate provided primitive information for a plurality of graphics primitives into a data structure for the first primitive block, wherein the aggregated information includes a first vertex having a corresponding first identifier;
   while the first primitive block is deactivated, aggregate provided primitive information into a data structure for a second primitive block; and
   in response to reactivation of the first primitive block, determine whether to re-use the first identifier to identify the first vertex for processing the first primitive block after the reactivation, wherein the determination is based on whether the processing circuitry indicated that the first identifier was being used for a new vertex while the first primitive block was deactivated.

2. The apparatus of claim 1, wherein, during aggregation of the provided primitive information, the primitive block circuitry is configured to store a single instance of data for the first vertex for multiple primitives that share the first vertex.

3. The apparatus of claim 1, further comprising:
   identifier tracking circuitry configured to maintain, for each of multiple different identifiers and multiple different primitive blocks, an indication of whether an identifier has been used for a new vertex while a primitive block was deactivated.

4. The apparatus of claim 3, wherein the identifier tracking circuitry includes a bit for at least one index for primitive blocks that the apparatus is configured to support.

5. The apparatus of claim 3, wherein the identifiers are indices and state information for the first primitive block indicates validity information for the different identifiers.

6. The apparatus of claim 5, further comprising restore circuitry configured to alter the validity information for the first primitive block based on the identifier tracking circuitry in response to reactivation of the first primitive block.

7. The apparatus of claim 1, further comprising:
   fragment processing hardware configured to process primitive block data structures generated by the primitive block circuitry to generate pixel attributes for display.

8. A non-transitory computer readable storage medium having stored thereon design information that specifies a design of at least a portion of a hardware integrated circuit in a format recognized by a semiconductor fabrication system that is configured to use the design information to produce the circuit according to the design, including:
   graphics processing circuitry configured to:
   provide primitive information that includes respective different identifiers for different vertices and indicates, for each of the different identifiers, whether the identifier is being used for a new vertex; and
   switch between sending primitive information for different primitive blocks based on which primitive block is currently active;
   primitive block circuitry configured to:
   while a first primitive block is active, aggregate provided primitive information for a plurality of graphics primitives into a data structure for the first primitive block, wherein the aggregated information includes a first vertex having a corresponding first identifier;
   while the first primitive block is deactivated, aggregate provided primitive information into a data structure for a second primitive block; and
   in response to reactivation of the first primitive block, determine whether to re-use the first identifier to identify the first vertex for processing the first primitive block after the reactivation, wherein the determination is based on whether the processing circuitry indicated that the first identifier was being used for a new vertex while the first primitive block was deactivated.

9. The non-transitory computer readable storage medium of claim 8, wherein aggregation of the provided primitive information includes storing a single instance of data for the first vertex for multiple primitives that share the first vertex.

10. The non-transitory computer readable storage medium of claim 8, wherein the design information further specifies that the circuit includes:
    identifier tracking circuitry configured to maintain, for each of multiple different identifiers and multiple different primitive blocks, an indication of whether an identifier has been used for a new vertex while a primitive block was deactivated.

11. The non-transitory computer readable storage medium of claim 10, wherein the identifier tracking circuitry includes a bit for at least one index for primitive blocks that the circuit is configured to support.

12. The non-transitory computer readable storage medium of claim 10, wherein the identifiers are indices and state information for the first primitive block indicates validity information for the different identifiers.

13. The non-transitory computer readable storage medium of claim 12, wherein the design information further specifies that the circuit includes:
    restore circuitry configured to alter the validity information for the first primitive block based on the identifier tracking circuitry in response to reactivation of the first primitive block.

14. The non-transitory computer readable storage medium of claim 8, wherein the design information further specifies that the circuit includes:

fragment processing circuitry configured to process primitive block data structures generated by the primitive block circuitry to generate pixel attributes for display.

15. A method, comprising:
providing, by graphics processing circuitry, primitive information that includes respective different identifiers for different vertices and indicates, for each of the different identifiers, whether the identifier is being used for a new vertex;
switching, by the graphics processing circuitry, between sending primitive information for different primitive blocks based on which primitive block is currently active;
aggregating, by primitive block circuitry while a first primitive block is active, provided primitive information for a plurality of graphics primitives into a data structure for the first primitive block, wherein the aggregated information includes a first vertex having a corresponding first identifier;
while the first primitive block is deactivated, the primitive block circuitry aggregating provided primitive information into a data structure for a second primitive block; and
in response to reactivation of the first primitive block, the primitive block circuitry determining whether to re-use the first identifier to identify the first vertex for processing the first primitive block after the reactivation, wherein the determining is based on whether the processing circuitry indicated that the first identifier was being used for a new vertex while the first primitive block was deactivated.

16. The method of claim 15, wherein the aggregating includes storing a single instance of data for the first vertex for multiple primitives that share the first vertex.

17. The method of claim 15, further comprising maintaining, by identifier tracking circuitry for each of multiple different identifiers and multiple different primitive blocks, an indication of whether an identifier has been used for a new vertex while a primitive block was deactivated.

18. The method of claim 17, wherein the identifiers are indices and state information for the first primitive block indicates validity information for each of the different identifiers.

19. The method of claim 18, further comprising altering, by restore circuitry, validity information for the first primitive block based on the identifier tracking circuitry in response to reactivation of the first primitive block.

20. The method of claim 15, further comprising processing primitive block data structures generated by the primitive block circuitry to generate pixel attributes for display.

* * * * *